(12) United States Patent
Podmore et al.

(10) Patent No.: US 12,203,188 B2
(45) Date of Patent: Jan. 21, 2025

(54) ALUMINIUM AND MAGNESIUM COATED PART ASSEMBLY

(71) Applicant: McLaren Automotive Limited, Woking (GB)

(72) Inventors: Ella Podmore, Woking (GB); Emanuel Beck, Woking (GB); David Turner, Woking (GB); Mario Carandente, Woking (GB)

(73) Assignee: McLaren Automotive Limited, Woking (GB)

( * ) Notice: Subject to any disclaimer, the term of this patent is extended or adjusted under 35 U.S.C. 154(b) by 0 days.

(21) Appl. No.: 17/737,552

(22) Filed: May 5, 2022

(65) Prior Publication Data
US 2023/0357947 A1   Nov. 9, 2023

(30) Foreign Application Priority Data

May 5, 2021 (GB) .................................. 2106428.2

(51) Int. Cl.
*C25D 13/04* (2006.01)
*B32B 15/01* (2006.01)
(Continued)

(52) U.S. Cl.
CPC ............ *C25D 13/04* (2013.01); *B32B 15/016* (2013.01); *B32B 15/017* (2013.01); *B32B 15/04* (2013.01);
(Continued)

(58) Field of Classification Search
CPC ........ C25D 13/04; C25D 13/00; C25D 13/12; C25D 13/22; C23C 28/00; C23C 4/00; C23C 4/04; B32B 15/016; B32B 15/017; B32B 15/04; B32B 15/043; B32B 15/08; B32B 15/092; B32B 15/16; B32B 15/20;
(Continued)

(56) References Cited

U.S. PATENT DOCUMENTS

2009/0269501 A1   10/2009  Song et al.
2017/0298236 A1*  10/2017  Ott ...................... C09D 5/4453

FOREIGN PATENT DOCUMENTS

KR    1020190007199 A   1/2019
WO       2021177977 A1   9/2021

OTHER PUBLICATIONS

Machine Translation, Shin, KR 1020190007199 A, Jan. 2019. (Year: 2019).*

(Continued)

*Primary Examiner* — Michael E. La Villa
(74) *Attorney, Agent, or Firm* — Kilpatrick Townsend & Stockton LLP (57) ABSTRACT

A part assembly (100), comprising: an aluminium part (101); a magnesium part (102), the magnesium part (102) coated in a first coating (104); a bond (103), the bond (103) securing the aluminium part (101) to the coated magnesium part (114); wherein the aluminium part (101), the coated magnesium part (114) and the bond (103) are subjected to an electrophoresis coating process to coat the aluminium part (101) in a second coating (105). By subjecting the aluminium part (101), the coated magnesium part (114) and the bond (103) to an electrophoresis coating process to coat the aluminium part (101) in a second coating (105) this may provide a simpler manufacturing process.

9 Claims, 5 Drawing Sheets

(51) Int. Cl.
  *B32B 15/04* (2006.01)
  *B32B 15/08* (2006.01)
  *B32B 15/092* (2006.01)
  *B32B 15/16* (2006.01)
  *B32B 15/20* (2006.01)
  *C09D 5/44* (2006.01)
  *C23C 4/00* (2016.01)
  *C23C 4/04* (2006.01)
  *C23C 28/00* (2006.01)
  *C25D 13/00* (2006.01)
  *C25D 13/12* (2006.01)
  *C25D 13/22* (2006.01)

(52) U.S. Cl.
  CPC ............ *B32B 15/043* (2013.01); *B32B 15/08* (2013.01); *B32B 15/092* (2013.01); *B32B 15/16* (2013.01); *B32B 15/20* (2013.01); *C09D 5/44* (2013.01); *C09D 5/4476* (2013.01); *C09D 5/4488* (2013.01); *C09D 5/4492* (2013.01); *C23C 4/00* (2013.01); *C23C 4/04* (2013.01); *C23C 28/00* (2013.01); *C25D 13/00* (2013.01); *C25D 13/12* (2013.01); *C25D 13/22* (2013.01); *Y10T 428/12375* (2015.01); *Y10T 428/12382* (2015.01); *Y10T 428/12556* (2015.01); *Y10T 428/12569* (2015.01); *Y10T 428/12729* (2015.01); *Y10T 428/12736* (2015.01); *Y10T 428/2495* (2015.01); *Y10T 428/24959* (2015.01); *Y10T 428/24967* (2015.01); *Y10T 428/263* (2015.01); *Y10T 428/264* (2015.01); *Y10T 428/265* (2015.01)

(58) Field of Classification Search
  CPC ..... Y10T 428/12729; Y10T 428/12736; Y10T 428/12556; Y10T 428/12569; Y10T 428/12375; Y10T 428/12382; Y10T 428/2495; Y10T 428/24967; Y10T 428/24959; Y10T 428/263; Y10T 428/264; Y10T 428/265; C09D 5/44; C09D 5/4476; C09D 5/4488; C09D 5/4492

See application file for complete search history.

(56) References Cited

OTHER PUBLICATIONS

GB Application No. GB2106428.2 Search Report Under 17(5), mailed Oct. 28, 2021, 3 pages.
EP Applicaiton No. EP 22171828.1, "European Search Report, mailed Sep. 19, 2022", 7 pages.

* cited by examiner

ALUMINIUM AND MAGNESIUM COATED PART ASSEMBLY

CROSS-REFERENCE TO RELATED APPLICATIONS

This application claims priority to GB Patent Application No. GB 2106428.2, filed May 5, 2021, titled "Aluminium and Magnesium Coated Part Assembly," the entirety of which is hereby incorporated by reference.

FIELD OF THE INVENTION

The invention relates to an aluminium and magnesium coated part assembly and method of manufacture.

BACKGROUND

The use of magnesium and aluminium parts may provide a significant weight reduction to part assemblies when compared to steel. In particular, the combination of magnesium and aluminium parts in the same part assembly has been found to provide useful strength to weight ratios. These part assemblies may be advantageous to use in the transportation industry, such as automotive and aerospace applications.

Magnesium and aluminium parts are both susceptible to corrosion due to their reactivity. Aluminium parts may be coated using an electrophoretic deposition process. Magnesium parts may be more susceptible to corrosion and may be coated using a powder coating process.

Coating the magnesium and aluminium parts at the same time may not be possible due to the difference in the behaviour of the respective part materials and coating processes. To manufacture the part assembly, a coated magnesium-based part may be bonded to a coated aluminium part. This manufacturing process may have some disadvantages. Coating the magnesium and aluminium parts separately before bonding together may result in a long and complex manufacturing process. Additionally, bonding the coated magnesium part directly to the coated aluminium part may result in poor bond which may have reduced strength.

It is desirable to develop a part assembly and manufacturing method that overcomes the above problems.

SUMMARY

According to a first aspect there is provided a part assembly comprising: an aluminium part; a magnesium part, the magnesium part coated in a first coating; a bond, the bond securing the aluminium part to the coated magnesium part; wherein the aluminium part, the coated magnesium part and the bond are subjected to an electrophoresis coating process to coat the aluminium part in a second coating.

In some implementations, the part assembly may be configured wherein the coated magnesium part is not coated in the second coating.

In some implementations, the part assembly may be configured wherein the bond is not coated in the second coating.

In some implementations, the part assembly may be configured wherein the aluminium part and the coated magnesium part are planar.

In some implementations, the part assembly may be configured wherein a mating surface of the aluminium part is secured to a first mating surface of the bond.

In some implementations, the part assembly may be configured wherein a mating surface of the coated magnesium part is secured to a second mating surface of the bond.

In some implementations, the part assembly may be configured wherein a first mating edge of the coated aluminium part and a first mating edge of the coated magnesium part are arranged to be flush.

In some implementations, the part assembly may be configured wherein a second mating edge of the coated aluminium part and a second mating edge of the coated magnesium part are arranged to be flush.

In some implementations, the part assembly may be configured wherein the first coating material thickness is greater than 100 µm.

In some implementations, the part assembly may be configured wherein the second coating material thickness is greater than 20 µm.

In some implementations, the part assembly may be configured wherein the first coating material is a powder coating material.

In some implementations, the part assembly may be configured wherein the first coating is applied by spraying.

In some implementations, the part assembly may be configured wherein the first coating material comprises epoxy powder coating.

In some implementations, the part assembly may be configured wherein the second coating material comprises a black cathodic epoxy coating.

According to a second aspect there is provided a vehicle panel comprising the part assembly as described herein.

According to a third aspect there is provided a vehicle comprising the vehicle panel as described herein.

According to a fourth aspect there is provided a method of manufacturing a part assembly, the method comprising: providing an aluminium part secured to a coated magnesium part with a bond, the magnesium part being coated in a first coating; subjecting the aluminium part, the coated magnesium part and the bond to electrophoresis to coat the aluminium part in a second coating.

In some implementations, the method may be configured wherein the method comprises, before providing an aluminium part secured to a coated magnesium part with a bond, coating a magnesium part with a first coating.

In some implementations, the method may be configured wherein the method comprises, before providing an aluminium part secured to a coated magnesium part with a bond, securing the aluminium part to the coated magnesium part with a bond.

In some implementations, the method may be configured wherein subjecting the aluminium part, the coated magnesium part and the bond to electrophoresis does not coat the coated magnesium part in the second coating.

In some implementations, the method may be configured wherein subjecting the aluminium part, the coated magnesium part and the bond to electrophoresis does not coat the bond in the second coating.

In some implementations, the method may be configured wherein subjecting the aluminium part, the coated magnesium part and the bond to electrophoresis comprises: submerging the aluminium part, the coated magnesium part and the bond into a coating solution; applying a voltage to the aluminium part, the coated magnesium part and the bond in the coating solution; and removing the aluminium part, the coated magnesium part and the bond from the coating solution.

In some implementations, the method may be configured wherein subjecting the aluminium part, the coated magnesium part and the bond to electrophoresis further comprises, after removing the aluminium part, the coated magnesium part and the bond from the coating solution, heating the aluminium part, the coated magnesium part and the bond so as to cure the coating solution to form the second coating.

In some implementations, the method may be configured wherein subjecting the aluminium part, the coated magnesium part and the bond to electrophoresis further comprises, after removing the aluminium part, the coated magnesium part and the bond from the coating solution and before subjecting the aluminium part, the coated magnesium part and the bond to a temperature increase, rinsing the aluminium part, the coated magnesium part and the bond.

In some implementations, the method may be configured wherein the coating solution comprises a black cathodic epoxy coating.

In some implementations, the method may be configured wherein the applying a voltage to the aluminium part, the coated magnesium part and the bond comprises attaching an electrode to the aluminium part.

BRIEF DESCRIPTION OF THE FIGURES

The present invention will now be described by way of example with reference to the accompanying drawings. In the drawings:

FIGS. 3a-c schematically illustrate an exemplary embodiment of a method of manufacture of the present invention.

DETAILED DESCRIPTION

The part assembly and method of manufacture described herein concern an aluminium and magnesium coated part assembly and method of manufacture.

Embodiments of the present invention may tackle one or more of the problems previously mentioned by subjecting the aluminium part, the coated magnesium part and the bond to an electrophoresis coating process to coat the aluminium part in a second coating. In this way, it is possible to provide a simpler manufacturing process and a corrosion resistant part assembly bond.

Figures 1, 1A:
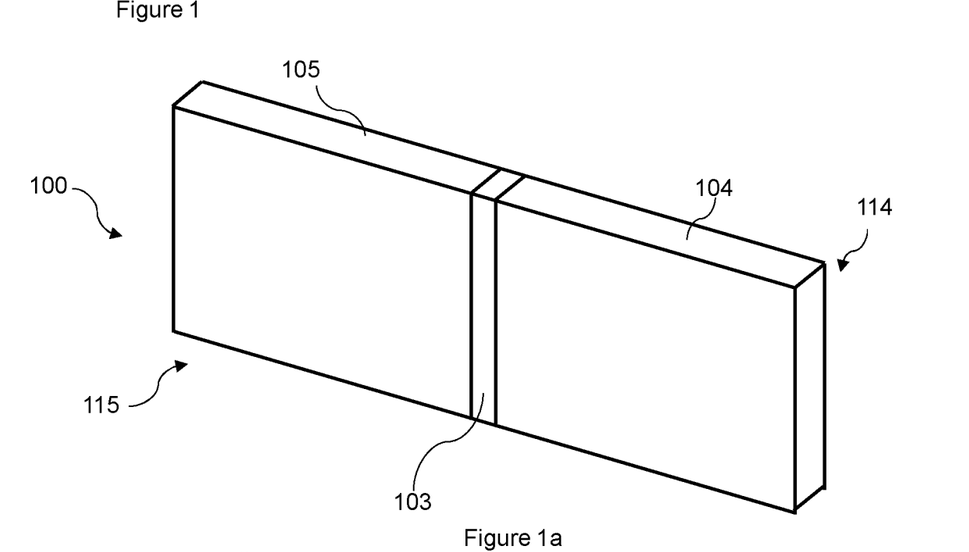
FIG. 1 schematically illustrates an exemplary embodiment of a part assembly of the present invention.
FIG. 1a schematically illustrates a perspective view of the part assembly of the embodiment.
Figure 1B:
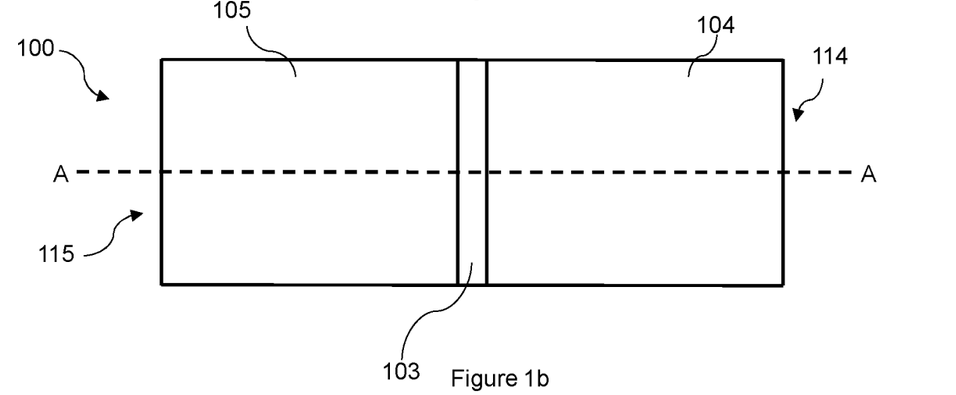
FIG. 1b schematically illustrates a side view of the part assembly of the embodiment including a section A-A.
Figure 1C:
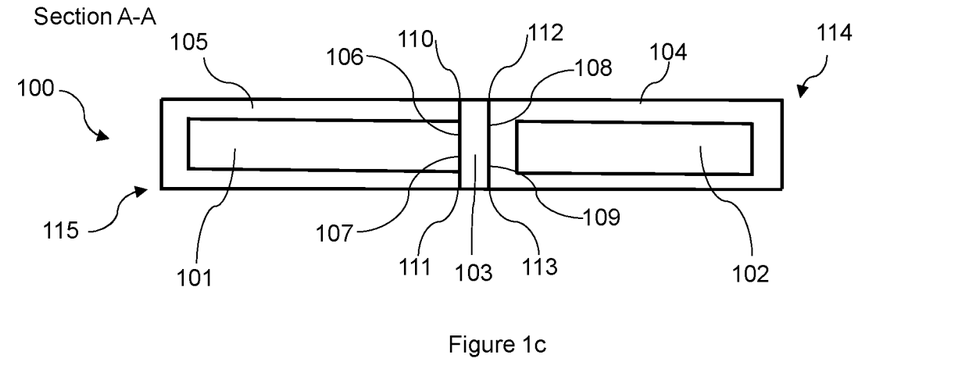
FIG. 1c schematically illustrates a cross-sectional view through the section A-A of FIG. 1b of the part assembly of the embodiment.

FIG. 1 schematically illustrates an exemplary embodiment of a part assembly of the present invention. FIG. 1a schematically illustrates a perspective view of the part assembly of the embodiment. FIG. 1b schematically illustrates a side view of the part assembly of the embodiment including a section A-A. FIG. 1c schematically illustrates a cross-sectional view through the section A-A of FIG. 1b of the part assembly of the embodiment.

FIG. 1 is illustrative and not to scale. It may be appreciated that the relative dimensions and shapes of the components may be varied within the scope of the invention.

FIG. 1c illustrates a part assembly 100 comprising an aluminium part 101 and a magnesium part 102. The aluminium part 101 may be an aluminium-based part. In other words, the aluminium-based part may comprise an aluminium alloy. Preferably, the aluminium alloy is a Superformed 5083 aluminium alloy. The magnesium part 102 may be a magnesium-based part. In other words, the magnesium-based part may comprise a magnesium alloy. Preferably, the magnesium alloy is a AZ31B magnesium alloy.

The magnesium part 102 may be coated in a first coating 104. The first coating 104 may comprise a powder coating. The first coating 104 may be applied by spraying. Alternatively, the first coating 104 may be applied by other means, such as dipping the magnesium part 102 in the first coating 104 material. By applying the powder coating over the magnesium part this may provide a smooth and even finish as described herein. The first coating 104 may comprise an epoxy powder coat material. This epoxy powder coat material may provide corrosion resistance to protect the magnesium part against oxidisation.

Additionally, the magnesium part 102 may be coated in a pre-treatment coating prior to applying the first coating 102. The pre-treatment coating may aid the adhesion between the magnesium part 102 and the first coating 104. The pre-treatment coating may further improve the corrosion resistance of the first coating 104.

Additionally, the first coating 104 may comprise more than one layer. For example, a first layer of the first coating 104 may be applied to the magnesium part 102, or to the pre-treatment coating on the magnesium part 102. A second layer of the first coating 104 may be applied to the first layer of the first coating 104. The first layer of the first coating 104 may be cured before the second layer of the first coating 104 is applied. Where the first coating 104 comprises more than two layers the curing and applying process may be repeated for each layer.

As shown in FIG. 1c, preferably, the first coating 104 may comprise a generally constant thickness around the magnesium part 102. By providing a constant thickness of the first coating 104 this may reduce the likelihood of weak spots through which corrosion may penetrate. Preferably, the first coating 104 may comprise a smooth outer surface as shown in FIGS. 1a and 1c. By providing a smooth outer surface this may reduce the likelihood of external components catching and damaging the first coating 104 which may create a hole through which corrosion may penetrate.

Preferably, the first coating 104 material thickness is greater than 100 μm. By providing this minimum thickness of the first coating 104 this may increase the strength of the first coating 104 and reduce the likelihood of external components damaging the first coating 104 which may create a hole through which corrosion may penetrate.

Additionally, the electrophoresis coating process, described herein, may cause the first coating 104 to corrode, deteriorate or delaminate. By providing this minimum thickness of the first coating 104 this may also enable the first coating 104 to retain structure during the electrophoresis coating process.

Coating the magnesium part 102 in a first coating 104 may provide a coated magnesium part 114.

As shown in FIG. 1c, the part assembly 100 may comprise a bond 103. The bond 103 may provide a securing means for securing the aluminium part 101 to the coated magnesium part 114.

The bond 103 material may comprise structural epoxy adhesive. This structural epoxy adhesive material may provide a high mechanical strength bond between the aluminium part 101 and the magnesium part 102. This structural epoxy adhesive material may also reduce the likelihood of a galvanic reaction between the aluminium part 101 and the magnesium part 102.

As shown in FIG. 1c, a first mating surface 107 of the bond 103 is secured to a mating surface 106 of the aluminium part 101. Preferably, the first mating surface 107 of the bond 103 is in direct contact with the aluminium part 101. The mating surface 106 of the aluminium part 101 may be provided on the surface facing the magnesium part 102, as shown in FIG. 1c. The bond 103 may cover the entire mating surface 106 of the aluminium part 101. In this way, the bond 103 may provide the maximum securing strength for securing the aluminium part 101 to the bond 103 and may reduce the likelihood of corrosion penetrating to the aluminium part through gaps in the bond 103.

As shown in FIG. 1c, a second mating surface 108 of the bond 103 is secured to a mating surface 109 of the coated magnesium part 114. Preferably, the second mating surface 108 of the bond 103 is in direct contact with the first coating 104. The mating surface 109 of the coated magnesium part 114 may be provided on the surface facing the aluminium part 101, as shown in FIG. 1c. The bond 103 may cover the entire mating surface 109 of the coated magnesium part 114. In this way, the bond 103 may provide the maximum securing strength for securing coated magnesium part 114 to the bond 103 and may reduce the likelihood of corrosion penetrating to the coated magnesium part 114 through gaps in the bond 103.

In an alternative embodiment, the first coating 104 may be arranged to comprise an opening through which the bond 103 may make direct contact with the magnesium part 102. This arrangement may provide a secure contact between the bond 103 and the magnesium part 102.

The bond 103 may comprise a rectangular cross-sectional structure as illustrated in FIG. 1c. Alternatively, the bond 103 may comprise a thin veneer or coating applied to the mating surfaces 106, 109 of the aluminium part 101 and magnesium part 102. In either event, as mentioned herein, preferably, the bond 103 may cover the entire mating surface 106 of the aluminium part 101 and the entire mating surface 109 of the coated magnesium part 114.

The aluminium part 101, the coated magnesium part 114 and the bond 103 may be subjected to an electrophoresis coating process so that the aluminium part 101 is coated in a second coating 105. Preferably, as shown in FIGS. 1a and 1c, the second coating 105 is arranged to cover the entire surface of the aluminium part 101 except for the mating surface 106. This arrangement may be a result of the electrophoresis coating process as the aluminium part 101 and the bond 103 may be subjected to the electrophoresis coating process together. This arrangement may enable the bond 103 to be in direct contact with the aluminium part 101 which may provide a secure contact.

As shown in FIGS. 1a and 1c, preferably, the second coating 105 is arranged to extend continuously over the aluminium part 101 up to the joint between the aluminium part 101 and the bond 103. This may provide a seal between the aluminium part 101 and the bond 103 which may reduce the likelihood of corrosion penetrating to the aluminium part 101 through the joint between the aluminium part 101 and the bond 103.

Coating the aluminium part 101 in a second coating 105 may provide a coated aluminium part 115.

Preferably, as shown in FIG. 1c, the coated magnesium part 114 is not coated in the second coating 105. This may be a result of the electrophoresis coating process as the first coating 104 may provide an insulating layer between the second coating 105 and the magnesium part 102 such that the electrophoresis coating process does not adhere the second coating 105 to the surface of the first coating 104.

The bond 103 may not be coated in the second coating 105. This may be because the bond 103 material is not electrically conductive.

The second coating 105 material may comprise a cathodic epoxy coating, such as a black cathodic epoxy coating. This cathodic epoxy coating material may provide high corrosion resistance to the aluminium part 102.

As shown in FIG. 1c, preferably, the second coating 105 comprises a generally constant thickness around the aluminium part 101. By providing a constant thickness of the second coating 105 this may reduce the likelihood of weak spots through which corrosion may penetrate. Preferably, the second coating 105 may comprise a smooth outer surface as shown in FIGS. 1a and 1c. By providing a smooth outer surface this may reduce the likelihood of external components catching and damaging the second coating 105 which may create a hole through which corrosion may penetrate.

Preferably, the second coating 105 material thickness is greater than 20 μm. By providing this minimum thickness of the second coating 105 this may increase the strength of the second coating 105 and reduce the likelihood of external components damaging the second coating 105 which may create a hole through which corrosion may penetrate.

Preferably, as shown in FIG. 1c, a first mating edge 110 of the coated aluminium part 115 and a first mating edge 112 of the coated magnesium part 114 are arranged to be flush. Additionally, a second mating edge 111 of the coated aluminium part 115 and a second mating edge 113 of the coated magnesium part 114 are arranged to be flush. In other words, the corresponding edges (110 and 112, 111 and 113) are aligned so that there is not a step or ridge provided on the surface of the part assembly 100. This may provide a smooth outer surface which may reduce the likelihood of external components catching and damaging the first coating 104 and the second coating 105 which may create a hole through which corrosion may penetrate.

In the embodiment shown in FIG. 1c, the bond 103 comprises a rectangular cross-sectional structure with a visible thickness. In this arrangement, the corresponding edges (110 and 112, 111 and 113) are aligned but are spaced apart by the bond 103. Alternatively, the bond 103 may comprise a thin veneer or coating which may not be clearly visible. In this alternative arrangement, the corresponding edges (110 and 112, 111 and 113) may be aligned and may be close. In other words, the thickness of the bond 103 may be varied. In either arrangement, it is preferable that the edges are aligned so that the bonding is flush.

The first mating edges 110, 112 may be provided on the upper edge (as shown in FIG. 1c) of the mating surfaces 106, 109 of the coated aluminium and coated magnesium parts 115, 114. The second mating edges 111, 113 may be provided on the lower edge (as shown in FIG. 1c) of the mating surfaces 106, 109 of the coated aluminium and coated magnesium parts 115, 114. In this embodiment, the edges 110, 111, 112, 113 are provided by the second coating 105 and the first coating 104.

As shown in FIG. 1c, the edges of the aluminium part 101 and the magnesium part 102 may also be arranged to be flush. As the aluminium part 101 and the magnesium part 102 are internal of the part assembly 100 it may not be essential for the parts to be flush. However, if the first coating 104 and the second coating 105 are sufficiently thin such that they are thinner than the difference between the position of the edges of the aluminium part 101 and the magnesium part 102 then this may provide a step or ridge in the part assembly 100. Therefore, it is preferable for the edges of the aluminium part 101 and the magnesium part 102 to be generally flush.

In an alternative embodiment, the aluminium part 101 and the magnesium part 102 may be arranged in corner, or similar, joint. In this alternative embodiment, the edges 110, 111, 112, 113 may not be flush and instead may provide a corner or angle.

FIG. 1 shows part assembly 100. The part assembly 100 illustrated in FIG. 1 comprises a planar structure. In other words, the height and width of the part assembly 100 is significantly wider that the depth of the part assembly 100. The part assembly 100 may also comprise a range of structures depending on the design requirements, such as two non-planar parts joined or a corner joint.

Figure 2:
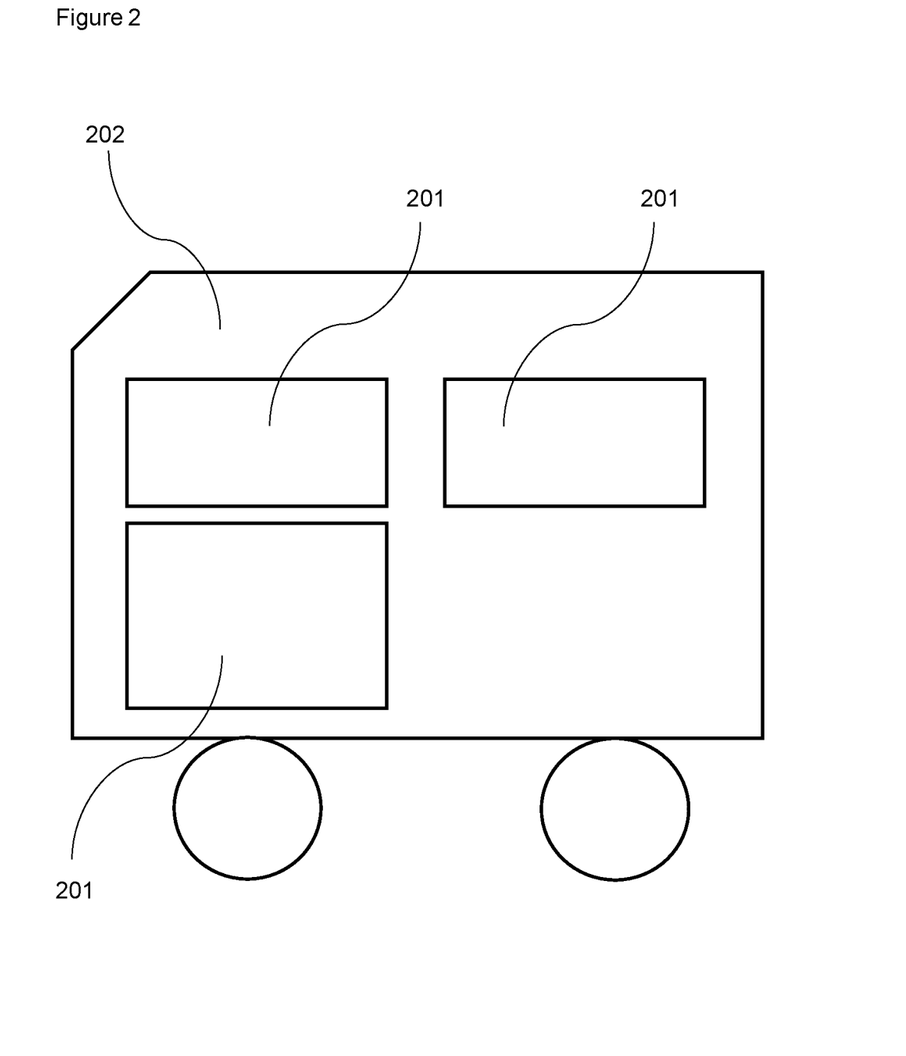
FIG. 2 illustrates an exemplary embodiment of a vehicle comprising a panel comprising the part assembly of the embodiment.

FIG. 2 illustrates an exemplary embodiment of a vehicle comprising a panel comprising the part assembly of the embodiment.

The part assembly 100 may be used in a panel 201, as shown in FIG. 2. The panel 201 may comprise one part assembly, or a plurality of part assemblies 100 depending on the design requirements for the panel 201. The part assembly 100 may also be used in a range of other applications, for example using the non-planar structure parts described herein.

The panel 201 may be used on a vehicle 202, as shown in FIG. 2. In particular, the vehicle 202 may be, for example, an automobile, train or aircraft. If the panel 201 is used on an automobile, the panel 201 may be a door panel.

The panel 201 may also be used in non-vehicle applications such as in building construction.

Figure 3A:
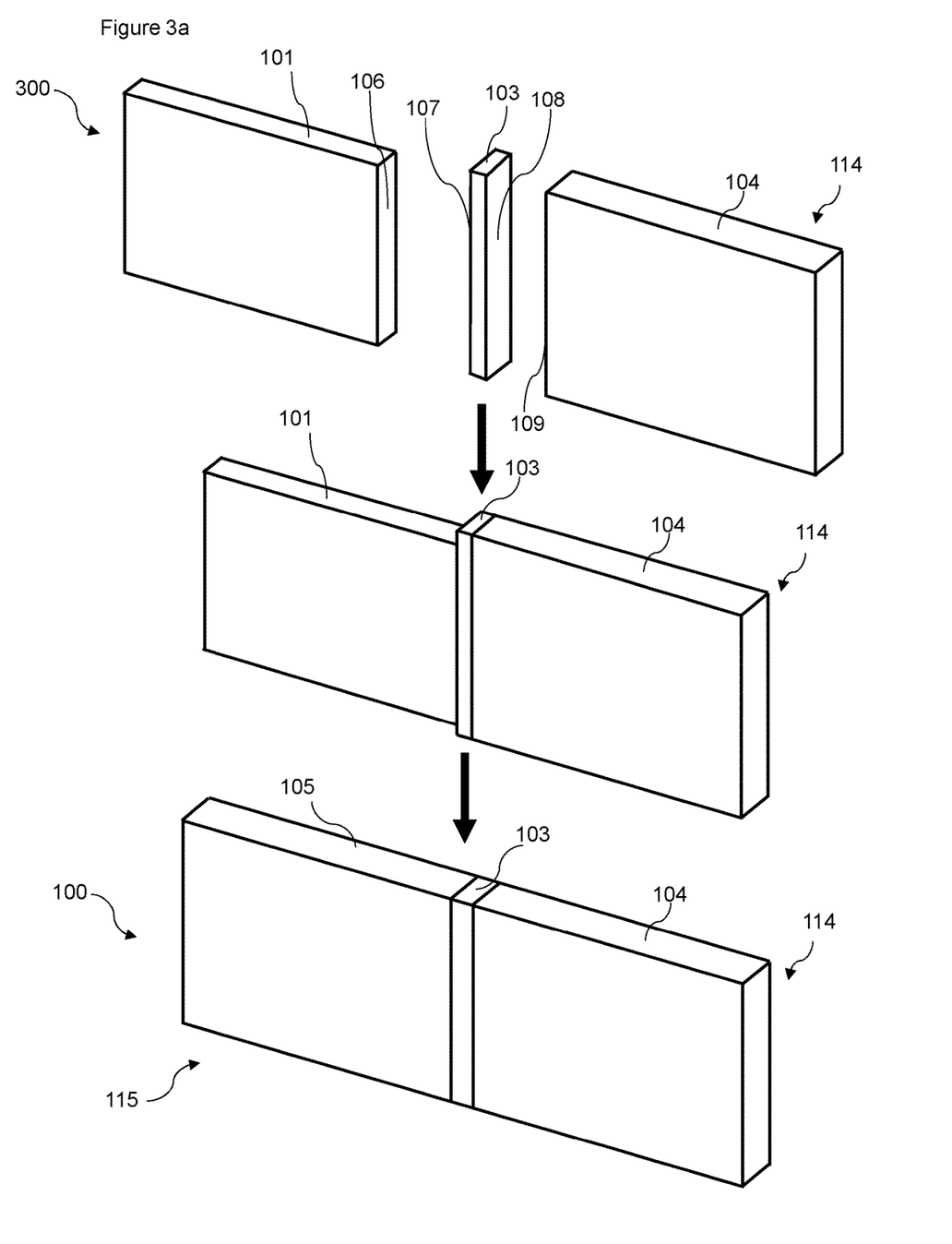
FIG. 3a schematically illustrates a perspective view of the method of manufacture of the embodiment.
Figure 3B:
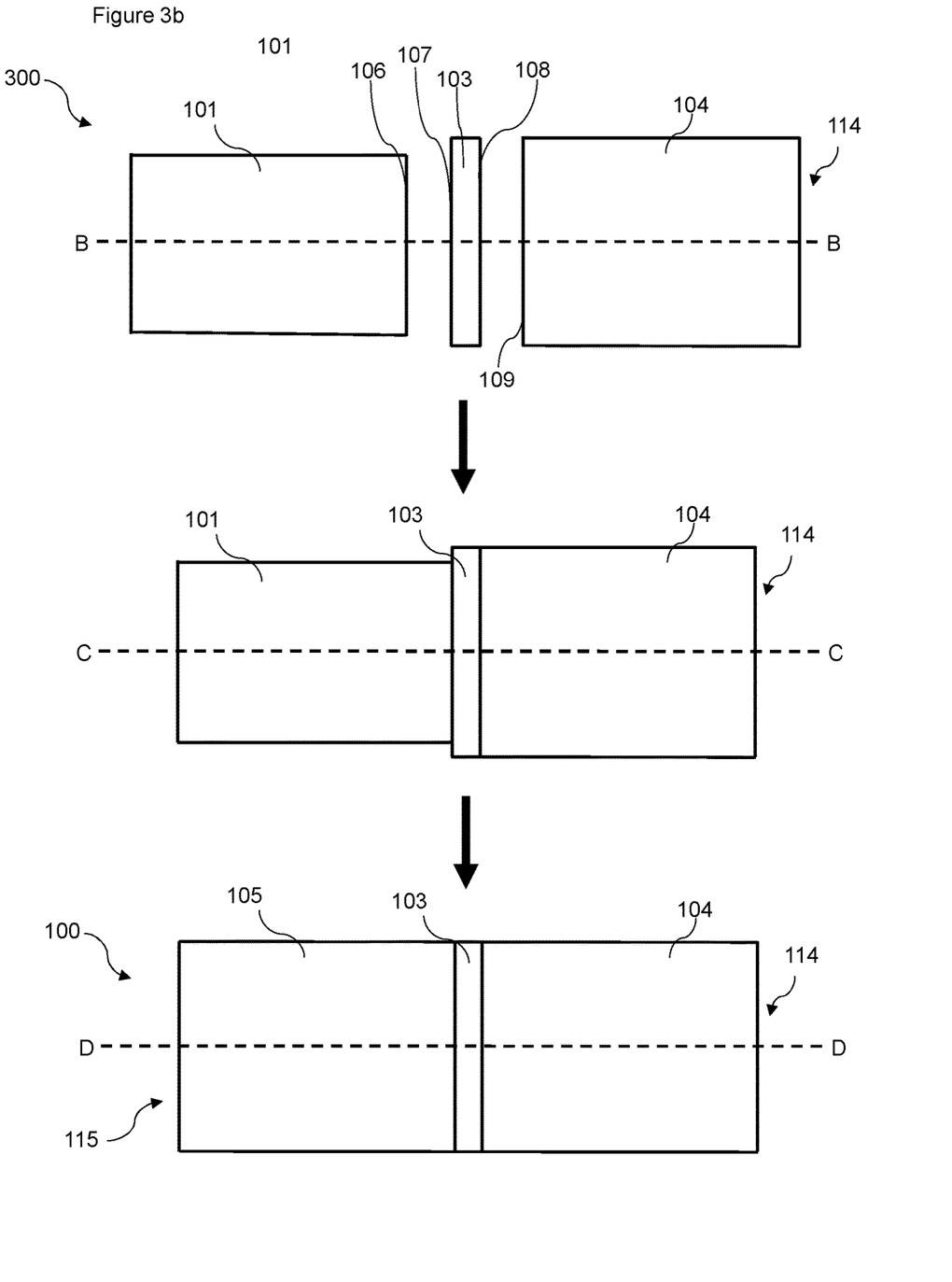
FIG. 3b schematically illustrates a side view of the method of manufacture of the embodiment including sections B-B, C-C and D-D.
Figure 3C:
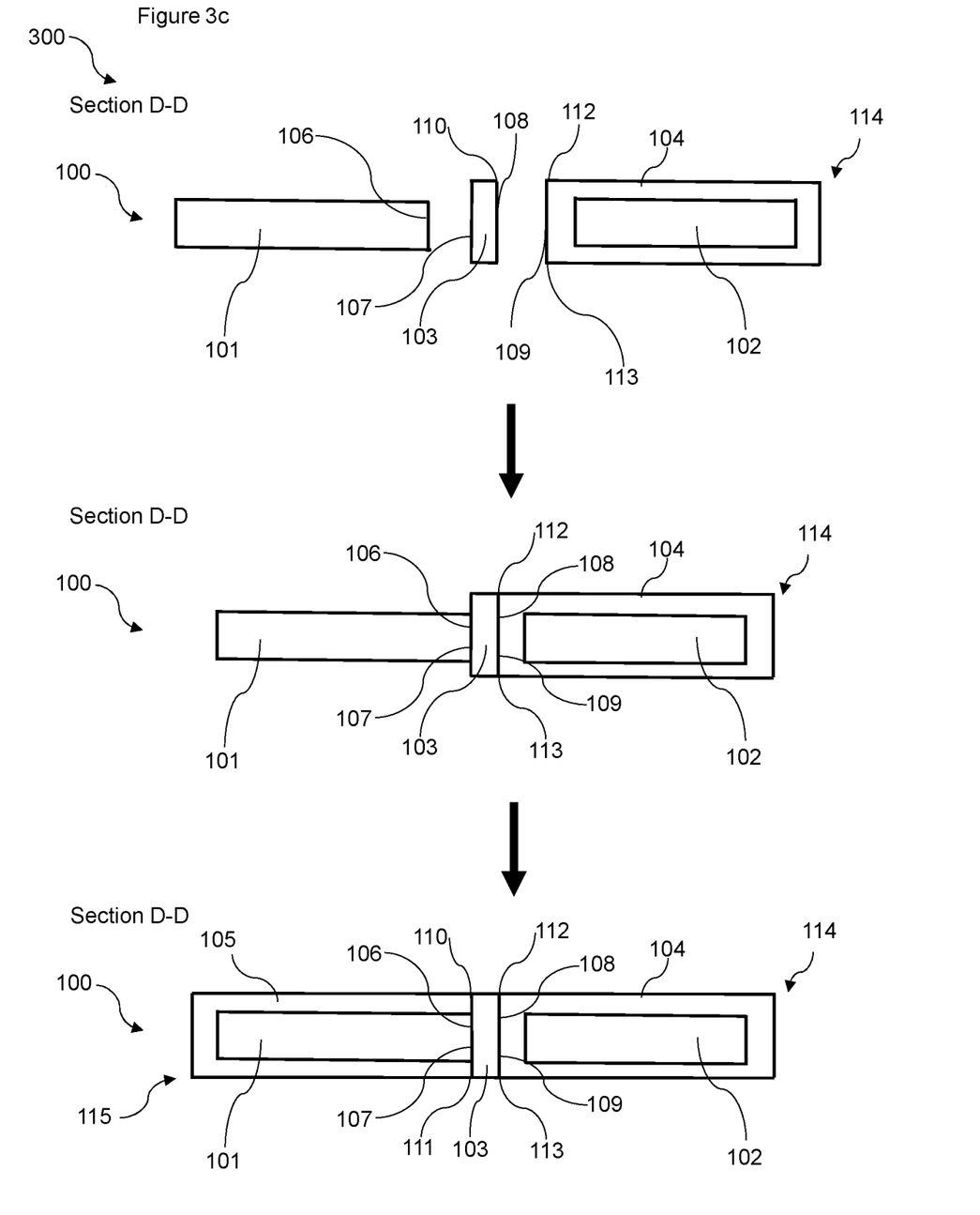
FIG. 3c schematically illustrates a cross-sectional view through the sections B-B, C-C and D-D of FIG. 3b of the method of manufacture of the embodiment.

FIGS. 3a-c schematically illustrate an exemplary embodiment of a method of manufacture of the present invention. FIG. 3a schematically illustrates a perspective view of the method of manufacture of the embodiment. FIG. 3b schematically illustrates a side view of the method of manufacture of the embodiment including sections B-B, C-C and D-D. FIG. 3c schematically illustrates a cross-sectional view through the sections B-B, C-C and D-D of FIG. 3b of the method of manufacture of the embodiment.

FIGS. 3a-c illustrate a method of manufacture 300 corresponding to the part assembly 100 described herein. It may be appreciated that the method of manufacture 300 may be used to manufacture a variety of alternative embodiments of the part assembly 100 within the scope of the invention.

As shown in FIGS. 3a-c, an aluminium part 101, a bond 103, and a coated magnesium 114 part are provided. The aluminium part 101 may be provided as described herein in relation to the part assembly 100. The bond 103 may be provided as described herein in relation to the part assembly 100. The coated magnesium part 114 may be provided as described herein in relation to the part assembly 100.

Before the coated magnesium part 114 is provided, a magnesium part 102 may be coated in a first coating 104, as described herein in relation to the part assembly 100, to form the coated magnesium part 114. The coating of the magnesium part 114 is not illustrated in FIGS. 3a-c. The coating of the magnesium part 102 may be carried as part of the manufacturing process 300. Alternatively, the coating of the magnesium part 102 may be carried out before the manufacturing process 300 or before the manufacturing process 300 such that the coated magnesium part 114 is provided for the manufacturing process 300.

As shown in FIGS. 3a-c, the aluminium part 101 is secured to the coated magnesium part 114 using a bond 103. The bond 103 may be arranged as described herein in relation to the part assembly 100. The securing of the aluminium part 101 to the coated magnesium part 114 is illustrated in FIGS. 3a-c. The securing of the aluminium part 101 to the coated magnesium part 114 may be carried as part of the manufacturing process 300. Alternatively, the securing of the aluminium part 101 to the coated magnesium part 114 may be carried out before the manufacturing process 300 or before the manufacturing process 300, such that the aluminium part 101 secured to the coated magnesium part 114 is provided for the manufacturing process 300.

The aluminium part 101, the coated magnesium part 114 and the bond 103 are subjected to an electrophoresis coating process. As shown in FIGS. 3a-c, the electrophoresis coating process coats the aluminium part 101 in a second coating 105. Preferably, as shown in FIGS. 3a and 3c, the second coating 105 covers the entire surface of the aluminium part 101 except for the mating surface 106. This arrangement may result from the aluminium part 101 and the bond 103, which are secured at their corresponding mating surfaces 106, 107, both being subjected to the electrophoresis coating process together. In this way, the surfaces 106, 107 are not exposed to the electrophoresis coating process.

Preferably, subjecting aluminium part 101, the coated magnesium part 114 and the bond 103 to an electrophoresis coating process does not coat the coated magnesium part 114 in the second coating 105. Preferably the first coating 104 may provide an insulating layer between the second coating 105 and the magnesium part 102 such that the electrophoresis coating process does not adhere the second coating 105 to the surface of the first coating 104.

Additionally, by subjecting aluminium part 101, the coated magnesium part 114 and the bond 103 to an electrophoresis coating process does not coat the bond 103 in the second coating 105. This may be because the bond 103 material is not electrically conductive. Preferably, the bond 103 comprises a structural epoxy adhesive material, as described herein.

Preferably the first coating 104 has a thickness of greater than 100 µm. The electrophoresis coating process may cause the first coating 104 to deteriorate or delaminate. By providing a first coating 104 of sufficient thickness this may enable the first coating 104 to retain structure and not deteriorate or delaminate during the electrophoresis coating process. Preferably, after the electrophoresis coating process, the magnesium coated part 114 may survive a 720 hr Natural Salt Spray (NNS) test according to ASTM B117.

Before carrying out the electrophoresis coating process the aluminium part 101, the coated magnesium part 114 and the bond 103 may be cleaned. Additionally, before carrying out the electrophoresis coating process the aluminium part 101, the coated magnesium part 114 and the bond 103 may be coated in a conversion coating, such as an inorganic phosphate coating.

The electrophoresis coating process may comprise submerging the aluminium part 101, the coated magnesium part 114 and the bond 103 into a coating solution. The coating solution may comprise the black cathodic epoxy material in a fluid state.

The electrophoresis coating process may comprise applying a voltage to the aluminium part 101, the coated magnesium part 114 and the bond 103 in the coating solution. The voltage may be applied through an electrode to the aluminium part 101, such that the aluminium part 101, the coated magnesium part 114 and the bond 103 may provide an electrode. Alternatively, fasteners may be used to apply the voltage to the coated magnesium part 102. The coating solution may be oppositely charged to the aluminium part 101, the coated magnesium part 114 and the bond 103 providing the electrode such that particles in the coating solution may be attracted to the aluminium part 101. The voltage and/or the pH of the coating solution may be varied such that the rate of attraction of the particles in the coating solution may be varied. In this way, the application rate of the second coating 105 may be varied such that the thickness of the second coating 105 may be controlled. Alternatively, or additionally, the duration of the electrophoresis coating process may be varied such that the thickness of the second coating 105 may be controlled.

The electrophoresis coating process may comprise removing the aluminium part 101, the coated magnesium part 114 and the bond 103 from the coating solution. After the aluminium part 101, the coated magnesium part 114 and the bond 103 are removed from the coating solution the aluminium part 101, the coated magnesium part 114 and the bond 103 may be rinsed. The rinsing may clean and remove any residual coating solution from the aluminium part 101, the coated magnesium part 114 and the bond 103.

The electrophoresis coating process may comprise subjecting the aluminium part 101, the coated magnesium part 114 and the bond 103 to a temperature increase so as to cure the coating solution into the second coating 105. The temperature increase may comprise heating the aluminium part 101, the coated magnesium part 114 and the bond 103 to over 180° C. The aluminium part 101, the coated magnesium part 114 and the bond 103 may be cooled to harden and cure the second coating 105.

As described herein, the part assembly and method of manufacture may be practically applied to other implementations, such as panels and other structures, on different types of vehicles or non-vehicle applications.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A part assembly, comprising:
   an aluminium part;
   a magnesium part, the magnesium part coated in a first coating;
   a bond, the bond securing the aluminium part to the coated magnesium part;
   wherein the aluminium part, the coated magnesium part and the bond are subjected to an electrophoresis coating process to coat the aluminium part in a second coating, and the coated magnesium part is not coated in the second coating; and
   wherein a first mating edge of the coated aluminium part and a first mating edge of the coated magnesium part are arranged to be flush and aligned so that the bond is flush and aligned with the first mating edge of the coated aluminium part and the first mating edge of the coated magnesium part.

2. The part assembly according to claim 1, wherein the bond is not coated in the second coating.

3. The part assembly according to claim 1, wherein the aluminium part and the coated magnesium part are planar.

4. The part assembly according to claim 1, wherein a second mating edge of the coated aluminium part and a second mating edge of the coated magnesium part are arranged to be flush and aligned so that the bond is flush and aligned with the second mating edge of the coated aluminium part and the second mating edge of the coated magnesium part.

5. The part assembly according to claim 1, wherein the first coating material thickness is greater than 100 μm, and/or the second coating material thickness is greater than 20 μm.

6. The part assembly according to claim 1, wherein the first coating material is a powder coating material, the first coating is applied by spraying, and/or the first coating material comprises epoxy powder coating.

7. The part assembly according to claim 1, wherein the second coating material comprises a black cathodic epoxy coating.

8. A vehicle panel comprising the part assembly according to claim 1.

9. A vehicle comprising the vehicle panel according to claim 8.

* * * * *